United States Patent
Deckard

[15] 3,691,822
[45] Sept. 19, 1972

[54] FLEXIBLE SUPPORT STRUCTURE FOR VIBRATION TESTING

[72] Inventor: Charles E. Deckard, Huntsville, Ala.
[73] Assignee: Wyle Laboratories, El Segundo, Calif.
[22] Filed: Aug. 3, 1970
[21] Appl. No.: 60,674

[52] U.S. Cl. ....................73/71.6, 267/150, 310/27
[51] Int. Cl. ................................................G01m 7/00
[58] Field of Search......73/71, 71.2, 71.4, 71.5, 71.6; 267/150; 310/27

[56] References Cited

UNITED STATES PATENTS 3,318,139   5/1967   Crook..........................73/71.6

Primary Examiner—Richard C. Queisser
Assistant Examiner—John P. Beauchamp
Attorney—Lindenberg, Freilich and Wasserman

[57] ABSTRACT

A vibration testing device for supporting items to enable them to be vibrated in three orthogonal directions and pivoted about a vertical axis while maintaining them level, or horizontal, comprising an item-supporting platform surrounded by an intermediate member which, in turn, is surrounded by an outer member. A first group of resilient thin walled cylinders support the platform on the intermediate member, all of these cylinders oriented with their axes horizontal and extending circumferentially about the platform. A second group of resilient thin-walled cylinders support the intermediate member on the outer member, these cylinders all oriented with their axes vertical. Shaking forces are transmitted to the platform through a structure which includes an inner shaft attached to the platform, a cylindrical surrounding member which can be driven, and a group of resilient thin-walled cylinders whose axes extend parallel to the shaft and which are attached at diametrically opposite sides to the shaft and surrounding member, respectively.

5 Claims, 7 Drawing Figures

PATENTED SEP 19 1972

INVENTOR.
CHARLES E. DECKARD
BY
Lindenberg Freilich & Wasserman
ATTORNEYS

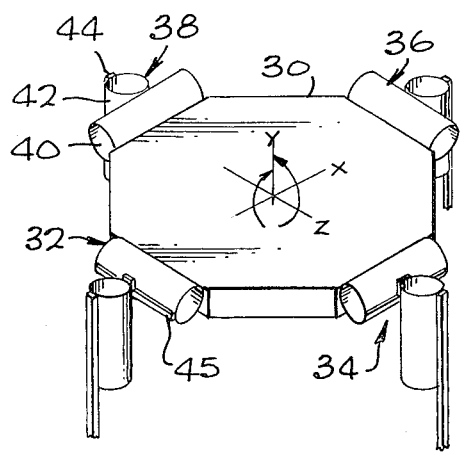
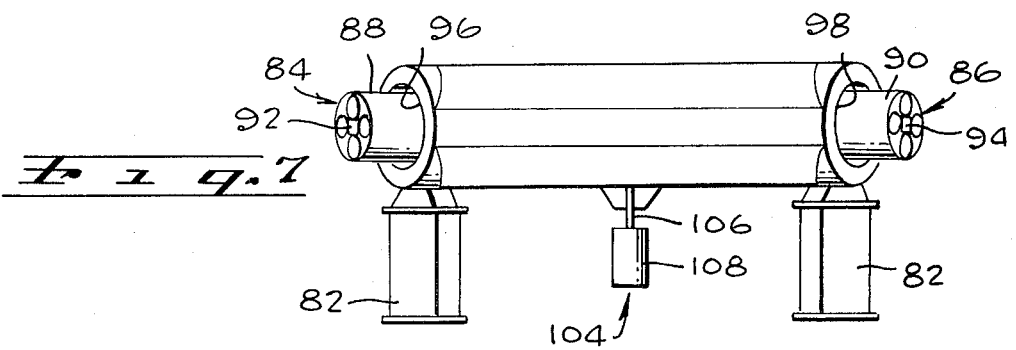
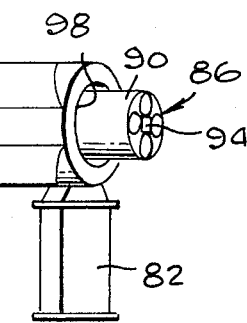
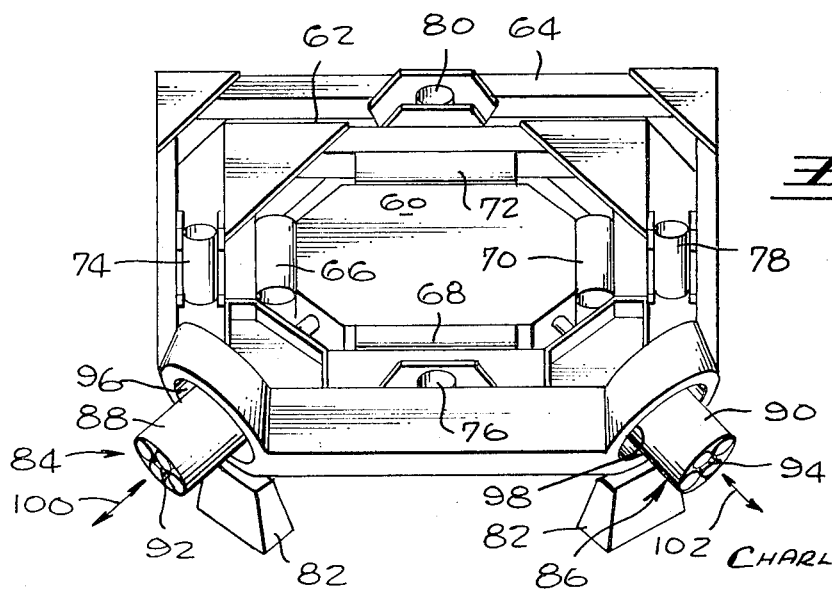

3,691,822

FLEXIBLE SUPPORT STRUCTURE FOR VIBRATION TESTING

BACKGROUND OF THE INVENTION

1. Field of the Invention

This invention relates to supporting structures and, more particularly, to structures which allow freedom of movement within a limited range in selected directions.

2. Description of the Prior Art

There are many types of machines which require the support of a member in a manner that enables resilient displacement in certain directions but great resistance to displacement in certain other directions. One example of an application is in vibration testing where it is necessary to determine the endurance of equipment when vibrated in certain directions, and where it is desirable to prevent vibrations in certain other directions. For example, some types of equipment are vibration tested for vibration in three orthogonal directions and about a vertical axis, but the equipment must be maintained in a level orientation throughout the test. While ordinary springs or elastomeric pads can be used for resilient support and a series of guide rails can be used to limit vibration to only certain directions, this type of equipment is relatively complex and expensive. In conducting tests on vibration testing apparatus, it is also necessary to provide means for imparting vibrations to the equipment-holding platform from conventional piston-type oscillators, or the like, in a manner that enables forces to be applied in one lineal direction without hampering vibrations in other directions.

SUMMARY OF THE INVENTION

In accordance with the present invention, apparatus is provided for enabling resilient deflection of a member from a neutral position in selected directions while strongly resisting deflections in other directions. The apparatus includes an inner member surrounded by an outer member, and four resilient thin-walled cylinders disposed between the members. The cylinders enable twisting and radial translation of the inner member with respect to the outer member while providing a spring-like action tending to return the inner member towards its original neutral position. However, the cylinders strongly resist any movement in the inner member in a direction parallel to the axes of the cylinders.

In accordance with one embodiment of the invention, a vibration table is provided which includes a platform, an intermediate member surrounding the platform, and an outer member surrounding the intermediate member. A first group of resilient thin-walled cylinders is disposed between the platform and intermediate member, and a second group of resilient thin-walled cylinders is disposed between the intermediate and outer members. The platform is horizontal and each of the first group of cylinders extends circumferentially about the platform with its axis horizontal and with diametrically opposite sides of the cylinder respectively joined to the platform and intermediate member. Each of the second group of cylinders extends with its axis vertical and with opposite sides respectively joined to the intermediate and outer members. The platform can vibrate in any horizontal direction as well as up and down, and can vibrate about a vertical axis. However, the platform strongly resists any tilting and therefore remains level, or horizontal.

The novel features of the invention are set forth with particularity in the appended claims. The invention will be best understood from the following description when read in conjunction with the accompanying drawings.

BRIEF DESCRIPTION OF THE DRAWINGS

FIG. 5 is a perspective view of a vibration table constructed in accordance with another embodiment of the invention;

FIG. 6 is a perspective view of a vibration table constructed in accordance with still another embodiment of the invention; and FIG. 7 is a side elevation view of the vibration table of FIG. 6.

DESCRIPTION OF THE PREFERRED EMBODIMENTS

Figure 1:
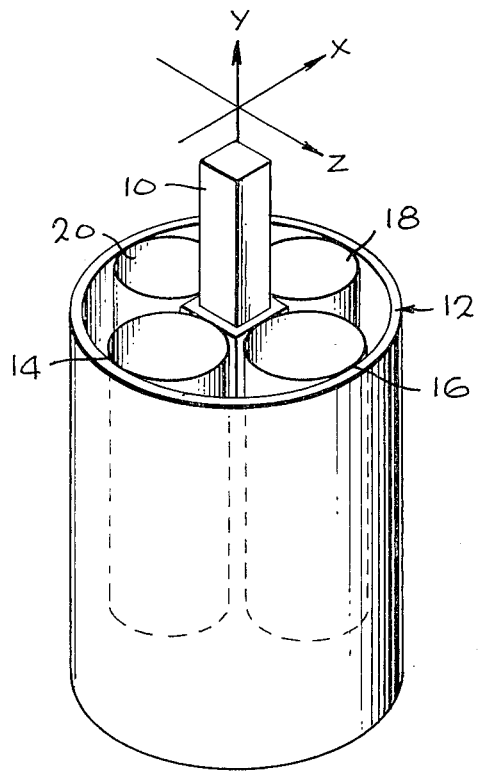
FIG. 1 is a perspective view of a flexure bearing assembly constructed in accordance with one embodiment of the present invention.

FIG. 1 illustrates a bearing assembly which includes an inner member or shaft 10, an outer member 12 surrounding the shaft, and four cylinders 14, 16, 18 and 20 disposed between the shaft and outer member. The shaft 10 and outer member 12 both are centered on a vertical or Y axis and the axes of the four cylinders also extend parallel to the Y axis. Each cylinder is thin-walled and is constructed of a resilient material. Diametrically opposite sides of the cylinders are fixed to the shaft 10 and outer member 12, respectively.

Figure 2:
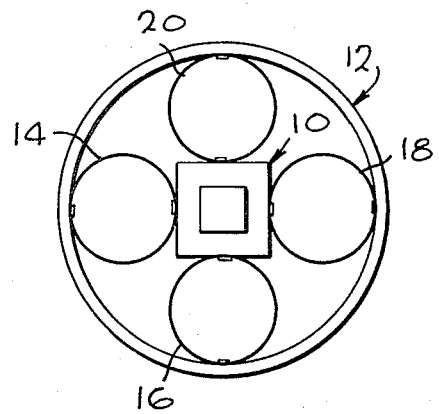
FIG. 2 is a plan view of the bearing assembly of FIG. 1.
Figure 3:
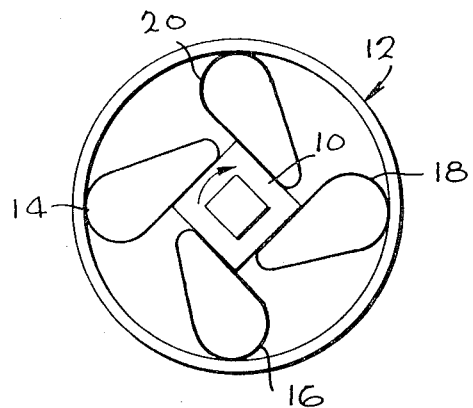
FIG. 3 is a view similar to FIG. 2, but with the shaft of the bearing assembly pivoted from its neutral position.

FIG. 2 is a top view of the bearing assembly, showing its configuration when the shaft 10 is in an undeflected or neutral position. FIG. 3 illustrates the bearing assembly when the shaft 10 has been pivoted about the vertical or Y axis. It can be seen that each of the cylinders deforms into a non-cylindrical shape. While the cylinders resist such deformation, they resist it with only a moderate spring force, so that a pivotal deflection of several degrees can be readily obtained and yet the shaft is resiliently urged towards its neutral position with a substantial force. The force urging the shaft back towards its neutral rotational position increases very greatly after several degrees of pivoting past the neutral position, as the cylinders become greatly deformed from a cylindrical shape. Thus, while small deflections can be readily made, the spring constant tending to return the shaft to its neutral position increases as deflection increases, and rotational deflections can be kept within a limit of several degrees.

Figure 4:
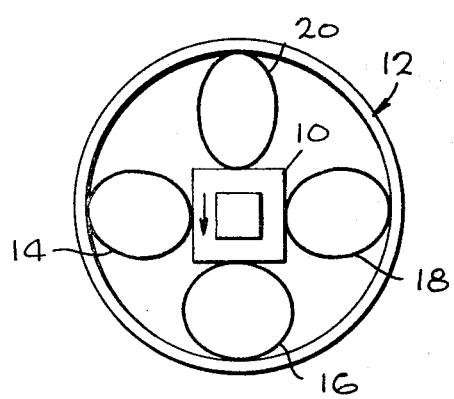
FIG. 4 is a view similar to FIG. 2, but with the shaft displaced to one side from its neutral position.

FIG. 4 illustrates a situation where the shaft 10 is deflected to one side, or along the Z direction, which tends to bring the shaft closer to one portion of the outer member 12. Such deflection causes the four cylinders 14-20 to be deformed into somewhat of an oval shape. This sideward deflection is resiliently resisted by the cylinders, with only a moderate spring constant for slight deflections and with the spring constant increasing as the deflection increases. Thus, the bearing apparatus enables slight sideward or radial deflections to be made, which are resiliently resisted, while strongly resisting very large sideward deflections. If it is attempted to cause sideward deflection at only one end of the bearing member, such as its top or bottom end (where the Y axis is the vertical), this will be strongly resisted. Therefore, the shaft 10 cannot pivot about the horizontal axes X and Z.

While the bearing assembly allows resilient pivoting about one axis (the Y axis), and allows translation along two axes (the X and Z axes), it strongly resists translation along one axis (the Y axis). Translation of the shaft 10 relative to the outer member 12 along the vertical or Y axis is strongly resisted by the cylinders 14-20. No appreciable translation in the Y direction can be made without applying a very large force, and then, the bearing assembly would break rather than resiliently deforming. The bearing assembly is useful in a variety of applications, including situations where it is necessary to impart forces in one direction (the Z direction) while permitting some flexibility in all other directions.

FIG. 5 is a simplified view of a vibration testing apparatus which includes a platform 30 for holding equipment to be vibrated in a manner that permits translation in all three axes, X, Y and Z, and pivoting about the vertical or Y axis. However, the apparatus strongly resists any pivoting about a horizontal axis (X or Z). That is, the platform 30 is designed to remain level while undergoing violent vibrations in every manner that does not require deviation from a level position. The platform 30 is supported by four supports 32, 34, 36 and 38. Each support includes an inner cylinder 40, an outer cylinder 42 and a post 44, the bottom of each post 44 resting on the ground. Each inner cylinder 40 extends in a circumferential direction about the platform 30, with its axis horizontal and with diametrically opposite sides of the cylinder respectively joined to the platform 30 and to the outer cylinder 42. Each of the outer cylinders 42 is oriented so that its axis is vertical, and diametrically opposite sides of the outer cylinder are respectively joined to the inner cylinder 40 and to the post 44. The joining of the inner and outer cylinders of each support is accomplished by a cross-shaped coupling member 45 that lies between the cylinders and is fixed to each cylinder along the length of the cylinder.

If the platform 30 is pushed up or down, only the inner cylinders 40 deflect, and they deflect in the manner of cylinders 14 and 18 in FIG. 4. The outer cylinders 42 do not deflect in this situation, since they strongly resist any up and down movement. Of course, deflection of only the inner cylinders 40 is sufficient to enable the platform to move up or down.

If the platform 30 is deflected in a horizontal direction along axis X, then all cylinders will deflect except for the inner cylinders of the support structures 34 and 38. However, deflection of the other cylinders is sufficient to enable deflection of the platform in the horizontal direction. In a similar manner, the platform can be deflected along the Z axis. Thus, the platform 30 can be deflected along three orthogonal directions. These deflections are resiliently resisted by the cylinders, but they can readily progress over a limited distance.

The platform 30 can also be pivoted, but only around the vertical or Y axis. In the case of pivoting about the Y axis, the outer cylinders 42 of the four supports deflect in the manner shown in FIG. 3 for the bearing assembly thereof. However, deflections around the X or Z axes are strongly resisted. If it is attempted to pivot the platform 30 about the X axis, then this would require deformation of the two support assemblies 32 and 36 in a manner that would be resisted by both inner and outer cylinders of each of these two support assemblies. In a similar manner, deflection about the Z axis would require deflection of the cylinders of the support assemblies 34 and 38 in a manner that would be highly resisted. Accordingly, no appreciable pivoting about the X or Z directions can occur with even a moderately high force. As a result, the platform 30 cannot be deflected away from a level orientation. Vibrations can be applied to the platform in a large number of ways. For example, a rotary solenoid can be used with the housing of the solenoid mounted to permit up and down movement and with the vertical output shaft of the solenoid connected by a universal coupling to the platform 30.

FIG. 6 is a view of a vibration testing machine constructed in accordance with another embodiment of the invention. In the machine of FIG. 6, a central platform 60 is employed which is surrounded by an intermediate member 62 and an outer member 64. A first group of four resilient thin-walled cylinders 66, 68, 70 and 72 with axes extending substantially circumferentially about the platform, connect the platform to the intermediate member 62. A second group of four resilient thin-walled cylinders 74, 76, 78 and 80, with vertically extending axes, join the intermediate member to the outer member. In this embodiment of the invention, the intermediate member 62 is in a continuous almost ring-like shape. However, it could be separated into four segments to provide a machine of the type shown in FIG. 5. A continuous intermediate member is, however, generally preferable to provide more regular motions and greater strength. In a similar manner, the outer member 64 is shown continuous, and supported by four legs 82 on the ground, although it could be constructed as four separate parts.

The vibration of the platform 60 is accomplished by two bearing assemblies 84, 86 of the type shown in FIG. 1. Each bearing assembly includes an outer or surrounding member 88 or 90, an inner shaft 92 or 94, and four thin-walled cylinders coupling the shaft to the surrounding member. The shafts 92, 94 extend through large openings in the intermediate member 62 and are fixed to the platform 60. The surrounding members 88, 90 extend through large openings 96, 98 in the outer member 64. Normally, each surrounding member 88, 90 does not contact the outer, intermediate or platform members 64, 62, 60, but only the four cylinders that couple the surrounding member to the shaft within it. Similarly, each of the shafts 92, 94 normally contacts only the platform 60 and the four resilient cylinders that couple the shaft to the surrounding members 88, 90.

The vibration of the platform 60 in the direction of arrows 100 is accomplished by oscillating the surrounding member 88 in the direction of arrows 100. Similarly, the oscillation of the platform 60 in the direction of arrows 102 is accomplished by oscillating the surrounding member 90 in the direction of arrows 102. The oscillation of either surrounding member 88, 90 can be accomplished by a simple linear driving device such as a solenoid. Each of the bearing assemblies transmits linear motion to the platform 60 in its longitudinal direction without preventing sideward or up and down deflections of the platform. Referring to FIG. 7, it can be seen that a third bearing assembly 104 is provided for oscillating the platform 60 in a vertical direction. The bearing assembly 104 includes a shaft 106 coupled by four thin-walled cylinders to a surrounding member 108 which can be fixed to a solenoid or other vibrating device for up and down motion.

Thus, the invention provides apparatus for supporting a member in a manner that enables vibrations in only selected directions, and which can provide a moderate spring force tending to return the member to a neutral position, the spring force increasing in spring constant for large vibrations to prevent excessive deflections. A vibration table is provided which can be supported to maintain a platform in a level orientation while enabling it to deflect in three orthogonal directions as well as pivot about a vertical axis. In the case of the level platform device, resilient thin-walled cylindrical members are shown for supporting one member within another. However, instead of using cylindrical members in this device, it is possible to use elongated closed curve looped members of substantially constant cross-section, although if they deviate substantially from a cylinder they may not provide a substantial spring force tending to return the supported member towards its neutral position with a rapidly increasing spring constant.

Although particular embodiments of the invention have been described and illustrated herein, it is recognized that modifications and variations may readily occur to those skilled in the art and, consequently, it is intended that the claims be interpreted to cover such modifications and equivalents.

What is claimed is:

1. Vibration testing apparatus comprising:
   an inner member for holding an article to be vibration tested;
   an outer member disposed about said inner member, said inner and outer members substantially centered on a predetermined axis;
   a first plurality of flexible substantially cylindrical elements disposed between said inner and outer members, each of said cylindrical elements having diametrically opposite sides respectively fixed to said inner and outer members;
   a surrounding member extending substantially coaxially with said predetermined axis about said outer member;
   a second plurality of flexible substantially cylindrical elements, each of said second elements positioned between said outer and surrounding members and having diametrically opposite sides fixed to said outer and surrounding members respectively; and
   vibration inducing means coupled to said inner member for vibrating it;
   one of said first or second plurality of cylindrical elements oriented with their axes parallel to said predetermined axis and the other plurality of cylindrical elements oriented with their axes substantially tangent to an imaginary line extending circumferentially about said predetermined axis.

2. Vibration testing apparatus comprising:
   an inner member substantially centered on a predetermined axis;
   an outer member extending substantially coaxial with said predetermined axis about said inner member;
   a plurality of bearing assemblies for coupling said inner and outer members, each assembly including a pair of tubular elements, each tubular element defining in section a closed curve of substantially constant cross-section;
   a first element of each pair having opposite sides respectively fixed to said inner member and coupled to the second element of the pair, and a second element of each pair having diametrically opposite sides respectively fixed to said outer member and coupled to the first element of the pair, said first and second elements of each pair extending perpendicular to each other; and
   means for vibrating said inner member.

3. Vibration testing apparatus for vibrating an article to be tested while maintaining it in a level orientation comprising:
   an inner member for coupling to an article to be tested;
   an intermediate member extending substantially coaxial with a vertical axis about said inner member;
   an outer member extending substantially coaxial with said vertical axis about said intermediate member;
   a first plurality of resilient tubular elements defining in section closed loops, said elements having opposite sides respectively joined to said inner and intermediate members;
   a second plurality of resilient elements defining closed loops, said elements having opposite sides respectively joined to said intermediate and outer members;
   each element of one of said plurality of elements extending vertically, and each element of the other of said plurality of elements extending horizontally and substantially tangential to an imaginary line which extends circumferentially about said central axis; and
   means for vibrating said inner member.

4. The apparatus described in claim 3 wherein:
   each of said elements is cylindrical.

5. The apparatus described in claim 3 wherein:
   said means for vibrating said inner member includes first and second force applying means, each including a central shaft attached to said inner member, an outer part, and a plurality of resilient cylindrical elements with diametrically opposite sides respectively fixed to said shaft and outer part, the central shaft of said first and second force applying means extending substantially at right angles to each other.

* * * * *